Figure 1:
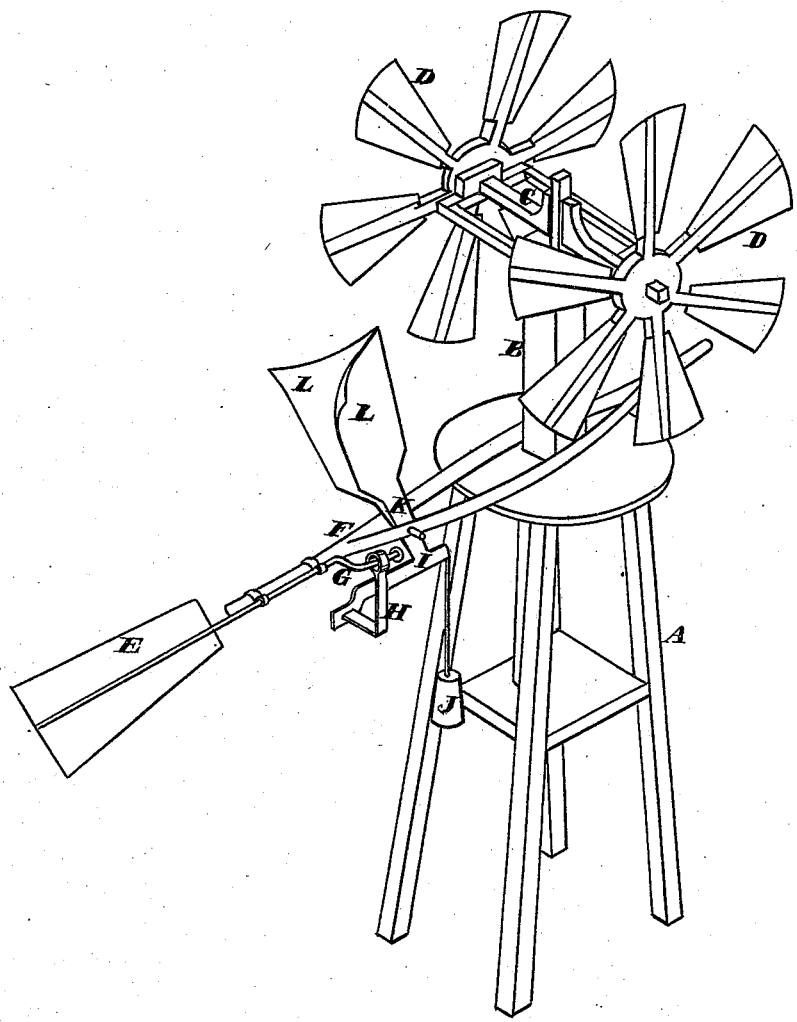

O. T. DAVIES.
WIND-MILL.

No. 173,449.

Patented Feb. 15, 1876.

Witnesses
Geo. H. Strong.
C. M. Richardson

Inventor
Owen T. Davies
By his Atty's
Dewey & Co

UNITED STATES PATENT OFFICE

OWEN T. DAVIES, OF BRIGHTON, CALIFORNIA.

IMPROVEMENT IN WINDMILLS.

Specification forming part of Letters Patent No. 173,449, dated February 15, 1876; application filed November 22, 1875.

*To all whom it may concern:*

Be it known that I, OWEN T. DAVIES, of Brighton, Sacramento county, State of California, have invented a Windmill; and do hereby declare the following description and accompanying drawings are sufficient to enable any person skilled in the art or science to which it most nearly appertains to make and use my said invention without further invention or experiment.

My invention relates to certain improvements in that class of windmills in which two wheels are mounted upon opposite ends of the same axis; and my improvements consist in a novel means for regulating the mill, and throwing it into or out of the wind.

Referring to the accompanying drawings for a more complete explanation of my invention, Figure 1 is a perspective view of the mill and regulator.

A is a frame having a turn-table or supporting-post, B, upon which the shaft C is mounted on suitable boxes, and carries the wind-wheels D D, one at each end, as shown. In order to regulate this mill and throw the wheels out of the wind, it is necessary to employ a tail, E, which stands at right angles with the wheel-shaft, being mounted upon an arm, F, so that it can rotate upon its axis. A crank, G, at the end of this axis, and a suitable connecting-rod, H, lead to the lever I, below the arm F. This lever is pivoted near its center, and a weight, J, is suspended from the end of it, so that it will force up the opposite end of the lever, and, through the connecting-rod H, act upon the crank G, and thus retain the tail in a horizontal or flat position, so as to allow the wind to pass freely. From the middle of the lever I an arm, K, extends upward, and has the double-winged tail L attached to it. This tail has ten leaves, shaped like the shares of a plow, flaring out at the top, and having their front edges joined.

The operation will, then, be as follows: During any ordinary wind the wheel will stand to the wind, and the tail E will lie horizontal. Whenever the wind increases to a gale it will act upon the side of one of the flaring wings L, in the manner of a propeller, and thus force it back. This forces the lever I down, and, through the connecting-rod H, operates the crank G, and thus turns the tail E so as to present its flat side to the wind, which will then force it around until the wheels are carried out of the wind. When the wind abates, the weight J will act to partially or wholly overcome the action of the wind upon the inclined wings L, and thus turn the tail E so as to again allow the wheels to be brought into the wind.

Having thus described my invention, what I claim, and desire to secure by Letters Patent, is—

The device consisting of the rotating tail E, with its crank G, connected with the lever I, the weight J, and the propeller-winged tail L, in combination with the double windmill D D, the whole constructed to operate substantially as and for the purpose described.

In witness whereof I hereunto set my hand and seal.

OWEN THOMAS DAVIES. [L. S.]

Witnesses:
 GEO. H. STRONG,
 C. M. RICHARDSON.